United States Patent [19]

Lyon et al.

[11] Patent Number: 4,747,467
[45] Date of Patent: May 31, 1988

[54] TURBINE ENGINE NOISE SUPPRESSION APPARATUS AND METHODS

[75] Inventors: Craig A. Lyon, Mesa; David F. Ross; Yogendra Sheoran, both of Scottsdale, all of Ariz.

[73] Assignee: Allied-Signal Inc., Morris Township, Morris County, N.J.

[21] Appl. No.: 846,771

[22] Filed: Apr. 1, 1986

[51] Int. Cl.⁴ .............................................. B64F 1/26
[52] U.S. Cl. ..................................... 181/218; 181/220; 181/222; 181/296
[58] Field of Search ............... 181/213, 217, 218, 220, 181/221, 252, 255, 257–263, 265, 266, 250, 270, 272, 256, 264, 224

[56] References Cited

U.S. PATENT DOCUMENTS

| | | | |
|---|---|---|---|
| 1,975,861 | 10/1934 | Oldberg | 181/250 |
| 2,685,936 | 8/1954 | Brenneman et al. | 181/218 |
| 2,798,743 | 8/1957 | Olesten | 181/218 X |
| 2,810,449 | 10/1957 | Coleman | 181/218 |
| 2,828,189 | 3/1958 | Houdry | 181/258 |
| 2,832,430 | 4/1958 | Coombs | 181/262 |
| 2,940,537 | 6/1960 | Smith et al. | 181/218 |
| 2,958,390 | 11/1960 | Montague | 181/255 |
| 3,159,238 | 12/1964 | Shearer | 181/218 X |
| 3,227,240 | 1/1966 | Lee et al. | 181/217 |
| 3,386,528 | 6/1968 | Kurtze | 181/218 |
| 3,396,535 | 8/1968 | Milos | 181/255 X |
| 3,415,337 | 12/1968 | Karasievich | 181/218 |
| 3,485,039 | 12/1969 | Wehinger | 181/262 X |
| 3,525,418 | 8/1970 | Smith et al. | 181/218 |
| 3,620,329 | 11/1971 | Wenzlaff | 181/218 |
| 3,688,865 | 9/1972 | Smith | 181/218 |
| 3,709,319 | 1/1973 | Lawyer et al. | 181/218 |
| 3,715,009 | 2/1973 | Smith et al. | 181/218 |
| 3,941,206 | 3/1976 | Helter | 181/256 |
| 4,113,048 | 9/1978 | Teodorescu | 181/220 |
| 4,128,769 | 12/1978 | Bons et al. | 181/218 X |
| 4,596,307 | 6/1986 | Challis | 181/269 |
| 4,623,035 | 11/1986 | Schad et al. | 181/265 X |
| 4,645,032 | 2/1987 | Ross et al. | 181/224 X |

*Primary Examiner*—Benjamin R. Fuller
*Attorney, Agent, or Firm*—R. Steven Linne; James W. McFarland

[57] ABSTRACT

A compact turbine engine exhaust gas noise suppressor has a housing having a first chamber, a second chamber having an outlet and communicating with the first chamber through a transfer passage, and a third chamber communicating with the first chamber through a perforated dividing wall and having a resonant sound attenuator positioned therein. A sound absorbing member is positioned in the second chamber to create therein a serpentine flow path extending between the transfer passage and the outlet. The exhaust gas noise is attenuated by flowing the exhaust gas into the first chamber through a duct into which ambient cooling air is educted, and then forcing the exhaust gas outwardly through the serpentine flow path.

38 Claims, 3 Drawing Sheets

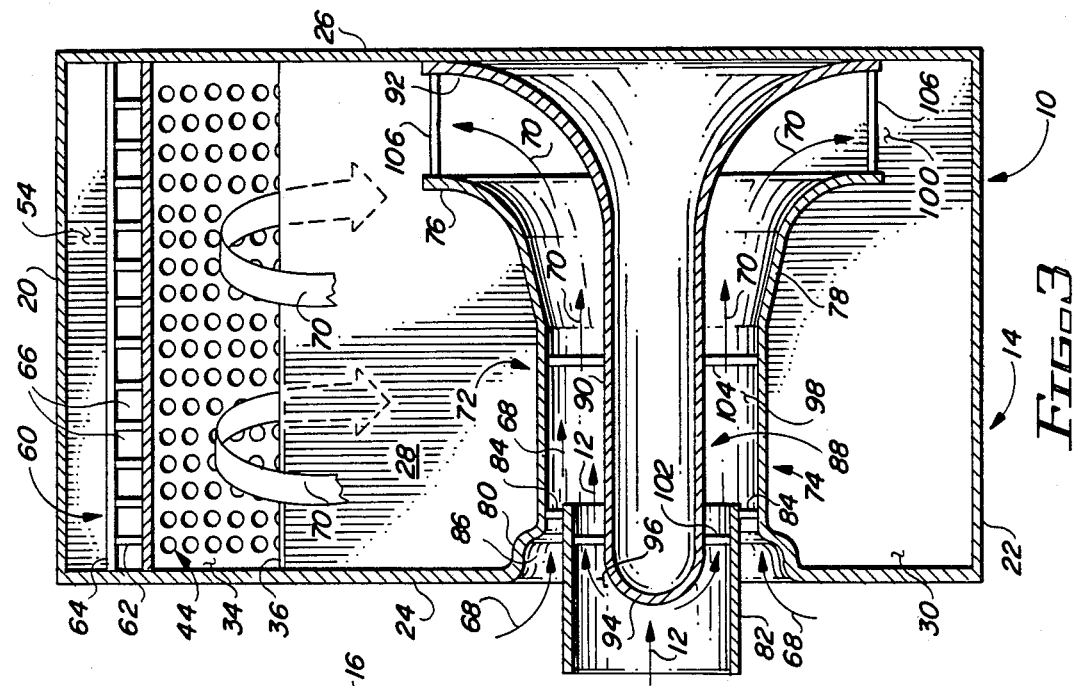
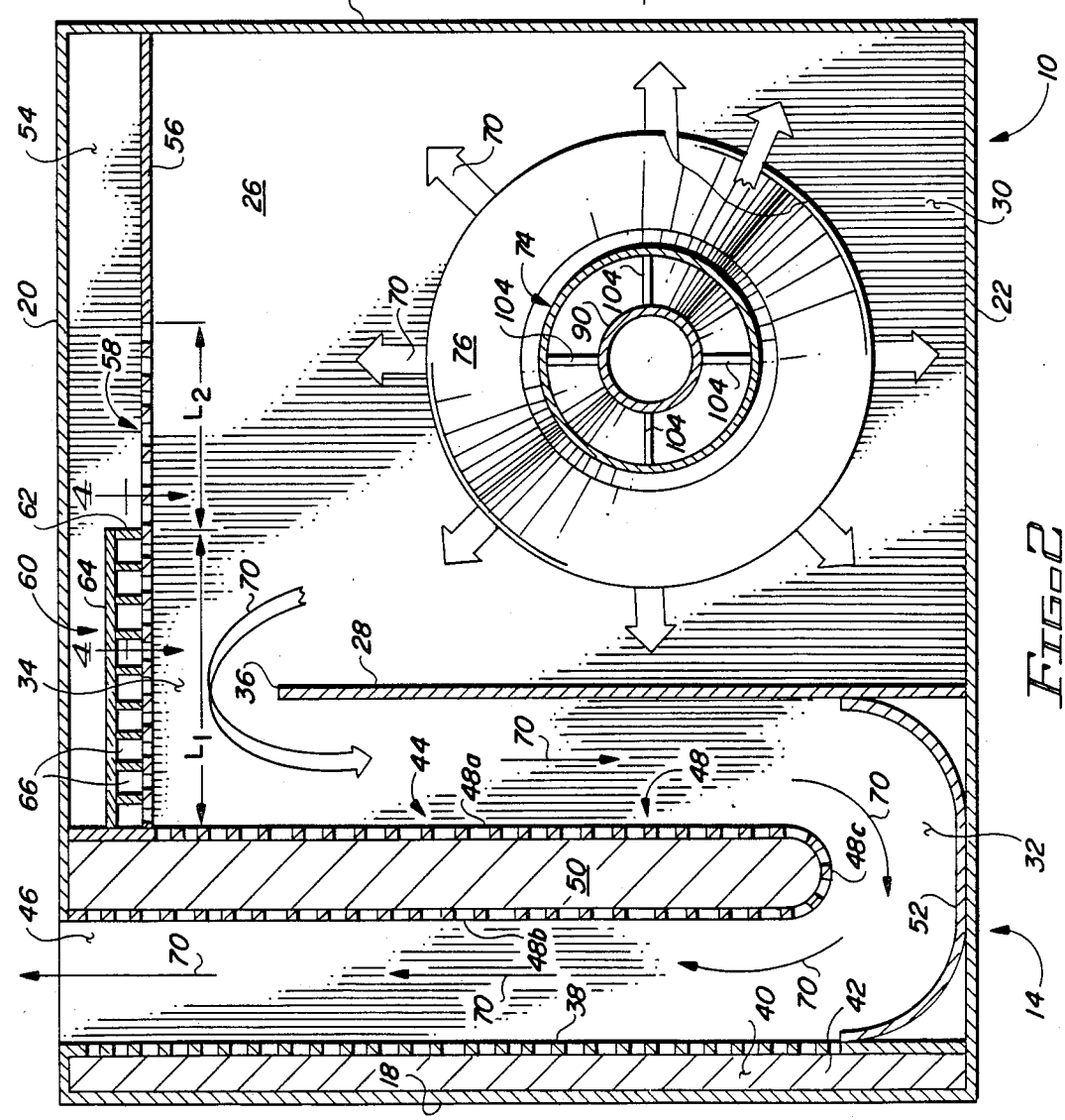

TURBINE ENGINE NOISE SUPPRESSION APPARATUS AND METHODS

BACKGROUND OF THE INVENTION

The present invention relates generally to engine exhaust gas noise suppression, and more particularly provides uniquely configured, compact apparatus, and associated methods, for cooling and attenuating the noise of exhaust gas discharged from a gas turbine engine.

With increasing frequency, gas turbine engines are being utilized in both stationary and mobile ground installations to perform a variety of functions such as generating electricity, providing a flow of compressed air, or furnishing mechanical power via a rotating shaft. In such ground installations, exhaust gas noise suppression apparatus typically must meet three performance criteria.

First, and perhaps foremost, the suppression apparatus must satisfactorily attenuate the engine noise associated with the hot, high velocity gas discharged from the engine. As is well known, such noise is of a fairly complex nature, being generated across varying frequency bands at different intensities, depending on the type and size of the particular engine. The primary noise components which must be attenuated are "core" and "turbine" noise.

Core noise is a low frequency noise component believed to be at least partly caused by the combustion processes within the engine, while turbine noise is a high frequency noise component caused by the interaction of high velocity gases within the engine's turbine section. The frequency spectrum of core noise is essentially broadband, peaking at a relatively low frequency around 200 to 800 Hz where most of the energy of such core noise is concentrated. Turbine noise, on the other hand, is a significantly higher frequency noise phenomenon, having both broadband and discrete spectral components, peaking at a relatively high frequency around 6,000 to 10,000 Hz.

The second performance criteria which often must be met is that the hot exhaust gas must be cooled before its discharge to atmosphere to protect operating or other personnel in the engine's vicinity from potential burn injuries. Additionally it is often desirable to generate (via the suppression apparatus) a cooling flow which serves not only to lower the ultimate discharge temperature of the exhaust gas, but also provides for cooling of miscellaneous equipment adjacent the engine and/or the noise suppression apparatus. The third performance criteria is that the particular noise suppression apparatus should not inordinately restrict the engine's exhaust gas flow.

Conventional apparatus utilized to cool and attenuate the noise of turbine engine exhaust gas typically must compromise between and among these three performance criteria. This previously necessary compromise is due to the high desirability of meeting the three criteria with suppression apparatus which fits within a suitably compact space envelope. For example, if a sufficient number of noise attenuating devices are positioned within the typical conventional exhaust gas sound attenuator to satisfactorily attenuate both the core and turbine noise components, the suppressor exits the realm of compactness, often approaching the size of the engine which it is designed to silence. On the other hand, if a suitable degree of compactness is achieved, other difficulties follow, such as a relatively high degree of gas flow restriction, insufficient noise reduction, and/or inability to adequately cool the exhaust gas flow prior to its discharge to atmosphere.

Accordingly, it is an object of the present invention to provide turbine engine exhaust gas noise suppression and cooling apparatus, and associated methods, which eliminates or minimizes above-mentioned and other problems typically associated with conventional apparatus and methods.

SUMMARY OF THE INVENTION

In carrying out principles of the present invention, in accordance with a preferred embodiment thereof, the noise associated with exhaust gas discharged from a turbine engine is very effectively attenuated by sequentially subjecting the exhaust gas to three distinct sound suppression mechanisms. First, the exhaust gas is flowed into, discharged in, and caused to abruptly expand within an expansion chamber configured to attenuate gas noise by creating an acoustic propagation impedance mismatch between the geometries of the gas inlet duct work and the expansion chamber. Secondly, gas noise within the chamber is transmitted to reactive sound attenuating means and resonant sound attenuating means connected in a parallel, overlapping relationship. Finally, the dicharged gas is forced outwardly from the chamber through a sound absorbing flow path having a serpentine configuration and defined in part by a hollow sound absorbing member filled with a bulk sound absorbing material.

This threefold sound suppression technique is effected in a preferred embodiment of the present invention by a uniquely configured, very compact sound absorbing apparatus comprising wall means which define a first chamber, a second chamber having an outlet and communicating with the first chamber through a transfer passage, and a reactive sound attenuating chamber communicating with the first chamber through a perforated section of an interior dividing wall. A latticed wall resonant sound attenuator is positioned within the sound attenuating chamber. The sound attenuating chamber overlaps the reactive attenuator and communicates with the first chamber through a portion of the perforated dividing wall section. A hollow sound absorbing member filled with a bulk sound absorbing material is positioned in the second chamber to create therein a serpentine flow path extending between the transfer passage and the apparatus outlet.

Duct means are provided for receiving, diffusing, and discharging engine exhaust gas, the duct means extending into the first chamber in a first direction and having a gas discharge opening positioned in the first chamber and facing in a second direction. During operation of the apparatus, exhaust gas noise is attenuated by flowing the gas sequentially through the duct means, into the first chamber, and outwardly through the serpentine flow path.

The engine's exhaust gas is cooled by eduction means which function, in response to the exhaust gas flow, to induce a flow of cooling air from a source thereof and mix the cooling air with the exhaust gas flow. In one embodiment of the present invention the eduction means are associated with the duct means through which exhaust gas is flowed into the apparatus. In another embodiment, a gas exhaust duct is connected to the apparatus outlet, and the eduction means are associated with the gas exhaust duct to cool the gas expelled therethrough.

The sound attenuating apparatus just described uniquely meets each of the three performance criteria previously discussed, while at the same time occupying only a relatively small space envelope. Specifically, this compact apparatus does not inordinately restrict the flow of engine exhaust gas, is highly effective in suppressing the noise associated with the exhaust gas—including the important "core" and "turbine" components thereof—and provides for efficient cooling of the hot exhaust gas.

BRIEF DESCRIPTION OF THE DRAWINGS

FIG. 2 is an enlarged scale cross-sectional view taken through the noise suppressor along line 2—2 of FIG. 1;

FIG. 3 is an enlarged scale cross-sectional view taken through the noise suppressor along line 3—3 of FIG. 1;

DETAILED DESCRIPTION

Figure 1:
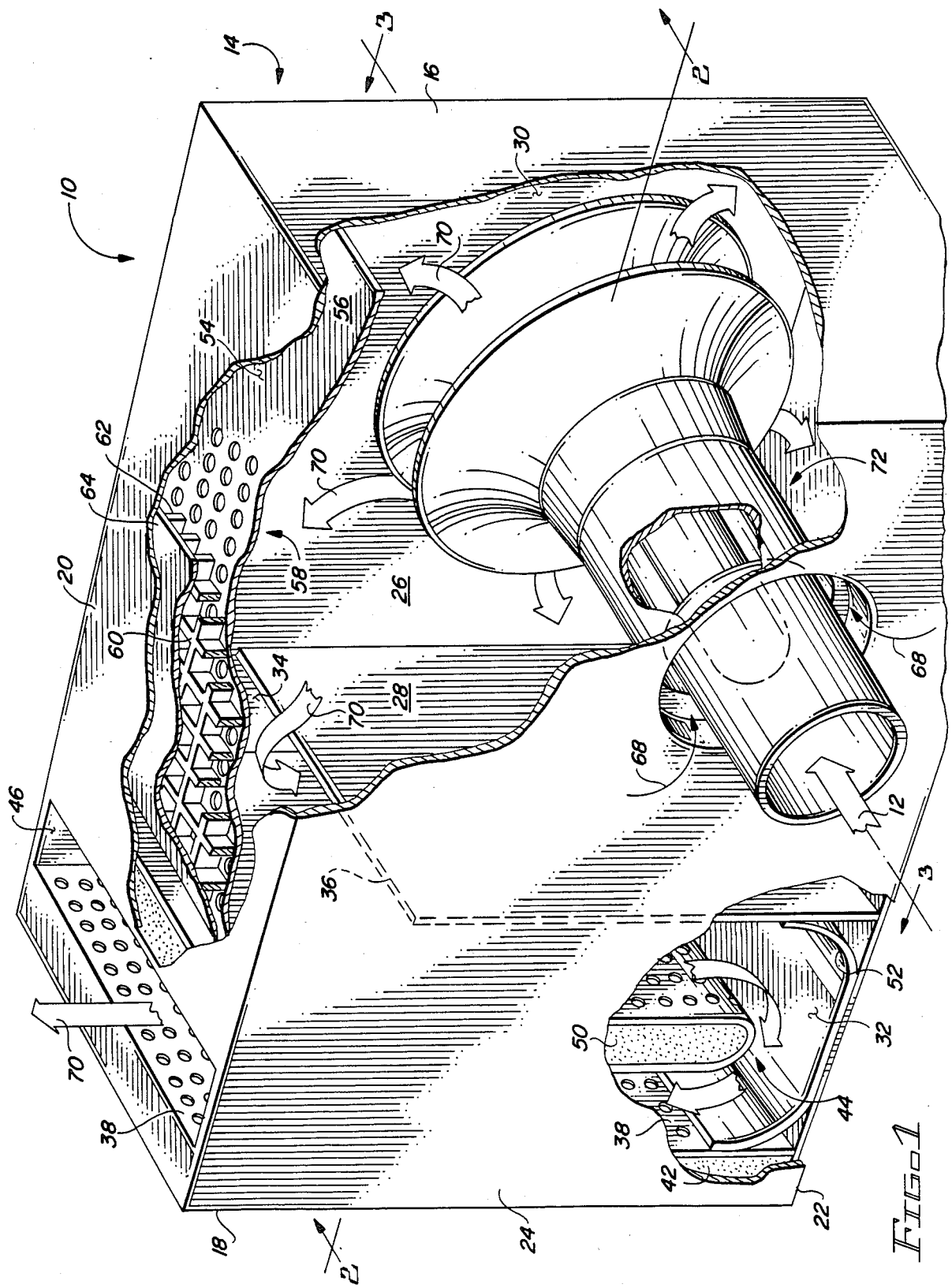
FIG. 1 is a perspective, partially sectioned view of a compact gas turbine engine exhaust noise suppressor embodying principles of the present invention.

Illustrated in FIGS. 1-3 is a compact sound attenuator 10 which embodies principles of the present invention and is utilized to attenuate the noise associated with exhaust gas 12 discharged from a gas turbine engine (not shown) and to cool the exhaust gas prior to its discharge to atmosphere. Attenuator 10 comprises a housing 14 having a generally rectangular cross-section, opposite end walls 16 and 18, upper and lower side walls 20 and 22, and front and rear side walls 24 and 26. These end and side walls define within the housing an interior chamber which is divided by a baffle member 28 into first and second subchambers 30,32 which communicate through a transfer passage 34. Baffle 28 is positioned between the end walls 16 and 18, and extends upwardly from the lower side wall 22, terminating in an upper end 36 which defines the lower boundary of the transfer passage 34.

Spaced inwardly from the left end wall 18, and extending parallel thereto, is a perforated dividing wall 38 which defines with the end wall 18 a cavity 40 which is filled with a suitable bulk sound absorbing material 42. A hollow sound absorbing member 44 extends downwardly from the upper side wall 20 between the perforated interior wall 38 and the baffle 28, and defines in the second subchamber 32 a sound absorbing flow path having a serpentine configuration and extending between the transfer passage 34 and a housing outlet 46 formed through the upper side wall 20 between the perforated wall 38 and the sound absorbing member 44. The hollow member 44 has a perforated outer wall section 48 which extends between housing side walls 24,26 and has a generally U-shaped cross-section as viewed in FIGS. 1 and 2. The curved wall 48 has a side wall portion $48_a$ facing the baffle 28, a side wall portion $48_b$ facing the perforated wall 38, and a rounded lower or inner end $48_c$ which faces and is spaced upwardly from the lower housing side wall 22. The interior cavity defined by the curved wall 48 is filled with a suitable bulk sound-absorbing material 50. As can be seen in FIG. 2, the inner wall end $48_c$ is positioned closer to the lower housing side wall 22 than is the inner end 36 of baffle 28.

A curved wall 52, having a generally U-shaped cross-section, is positioned at the bottom of the second subchamber 32 and extends between the perforated wall 38 and the baffle 28. Together with the curved end $48_c$ of sound-absorbing member 44, the curved wall 52 serves to round off the lower end of the previously mentioned serpentine flow path, thereby reducing overall turning losses associated with such flow path. The flow path extends from the transfer passage 34 downwardly between the baffle 28 and perforated side wall $48_a$, leftwardly between the curved wall 52 and curved inner wall end $48_c$ and upwardly between the perforated wall 38 and the perforated side wall $48_b$ to the housing outlet 46.

At the top of the housing 14 is a reactive sound attenuating chamber 54 which is defined by an interior dividing wall 56 that is positioned inwardly from the housing side wall 20 and extends between the sound absorbing member 44 and the housing end wall 16. The dividing wall 56 has formed therein a perforated section 58 which, as viewed in FIG. 2, extends rightwardly from the sound absorbing member 44 to a central longitudinal portion of the wall 56. A resonant sound attenuator 60 is positioned within the reactive sound attenuating chamber 54 and comprises a latticed wall structure 62 and a covering wall 64.

The term "reactive", in the sound attenuation context used herein, means that the sound attenuation characteristics of the particular attenuator (i.e., the chamber 54) arise from, and are primarily effected by, its overall volume and configuration. Stated otherwise, the attenuation characteristics of a reactive attenuator are dimension-dominated. The term "resonant", on the other hand, means that the sound attenuation characteristics of the particular attenuator are, as to sound inflow thereto, resistance-dominated.

Figure 4:
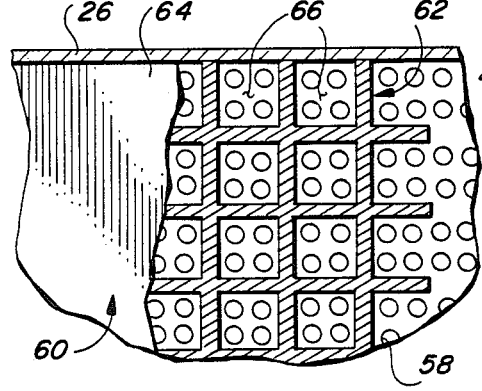
FIG. 4 is a fragmentary, enlarged scale cross-sectional view taken through the noise suppressor along the offset line 4—4 of FIG. 2.

The latticed wall 62 has a lower side surface which is positioned against the upper surface of the perforated wall section 58 within chamber 54. Perpendicularly extending lattice elements of wall 62 define therein a multiplicity of sound attenuating cells 66 (FIGS. 2 and 4) which communicate with the first and second subchambers 30,32 via the perforations in wall sections 58. As can best be seen in FIGS. 2 and 3, the latticed wall 62 extends completely between the housing walls 24,26, and extends rightwardly from the perforated wall 48 a distance $L_1$, thereby leaving a length $L_2$ of the perforated wall section 58 uncovered so that there is direct communication between chambers 30 and 54 via the perforations in wall section 58 along the length $L_2$ thereof. The height of the latticed wall structure 62 is less than the height of chamber 54 so that chamber 54 extends above and overlaps the latticed wall along its entire length and width. The solid covering wall 64 is suitably secured to the upper side surface of the latticed wall 62 thereby blocking off the upper ends of the multiplicity of the individual sound attenuating cells 66.

Engine exhaust gas 12 and ambient cooling air 68 are flowed into the first subchamber 30, and mixed to form a cooled, diluted exhaust gas flow 70, by means of a compact inlet diffuser duct structure 72. Structure 72 includes a circularly cross-sectioned inlet duct 74 which extends inwardly from the housing wall 24 and terminates at its right end (as viewed in FIGS. 1 and 3) in a generally bell-shaped outlet end 76 which is spaced leftwardly from the housing wall 26 within the subchamber 30. Immediately to the left of the bell-shaped outlet end 76 the inlet duct 74 has formed therein a radially outwardly flared diffusion section 78. At its left end, immediately adjacent the housing wall 24 (FIG. 3) the inlet duct has an outwardly flared section 80 around its periphery.

Extending coaxially into this enlarged inlet duct section 80 is an open ended, circularly cross-sectioned exhaust gas inlet stub duct 82. The duct 82 is of a smaller diameter than the main inlet duct 74, and is intersecured therewith by means of a circumferentially spaced series of small support struts 84. The stub duct 82 defines with the flared inlet section 80 an annular eduction cooling air inlet 86.

The third component of the duct structure 72 is a core member 88 which has an elongated cylindrical central stem portion 90 of a diameter smaller than that of stub duct 82, and a generally bell-shaped end portion 92. The stem 90 extends coaxially within the concentric ducts 74,82 and has a closed, rounded upstream end portion 94 which is received within the stub duct 82 and defines therewith an annular inlet passage 96. The bell end portion 92 of the core 88 is positioned immediately adjacent the housing wall 26 and has a surface curvature similar to that of the outlet end portion 76 of duct 74. Core 88 and duct 74 collectively define an annular flow passage 98 which terminates at its downstream end in an annular, radially outwardly facing discharge opening 100 positioned between the outer peripheries of the bell-shaped duct portions 76,92. The stem portion 90 of the core 88 is respectively intersecured to the stub duct 82 and the main inlet duct 74 by circumferentially spaced series of support struts 102 and 104, while the bell-shaped duct portions 76,92 are intersecured by a circumferentially spaced series of axially extending support struts 106.

During operation of the attenuator 10, hot engine exhaust gas 12 is forced into the inlet stub duct 82 and into the main inlet duct 74 via the annular passage 96. Entry of the hot exhaust gas 12 into the duct 74 draws a flow of ambient cooling air 68 thereinto, via the annular air inlet 86, by means of eduction. The educted cooling air is mixed with the hot exhaust gas and is carried thereby toward the annular discharge opening 100 through the annular passage 98. As the exhaust gas-cooling air mixture flows toward such annular outlet, it traverses the diffusion section of the annular passage 98 defined in part by the flared wall section 78 of the main inlet duct 74. As can best be seen in FIG. 3, as the exhaust gas-cooling air mixture 70 is forced closer to the outlet 100 it is further diffused due to an additional widening of the annular passage 98 adjacent the discharge opening 100. Finally, the exhaust gas-cooling air mixture 70 is forced radially outwardly through the discharge opening 100 into the first subchamber 30 which, as will be seen, functions as an expansion chamber for the cooled gas mixture 70.

The diffusion of the gas-air mixture 70 in the annular passage 98 appreciably retards the velocity of such mixture, thereby enhancing both further mixing and cooling of the flow streams 12 and 68, and reducing the exit velocity of such mixture from the annular discharge opening 100. This latter velocity reduction permits the discharge opening 100 to be placed in relatively close proximity to the inner surfaces of the housing (as best illustrated in FIG. 2) while at the same time avoiding excessive turbulence of the discharged mixture as it is flowed against the inner housing surfaces.

As the exhaust gas-cooling air mixture 70 is discharged from the annular opening 100 into the subchamber 30 the mixture 70 is caused to abruptly expand within the chamber, thereby creating an acoustic propagation impedance mismatch between the flowing gas and the discharged gas. Such impedance mismatch effects a low frequency noise attenuation within the expansion chamber 30 which is particularly effective in reducing the "core" noise component generated by the turbine engine. The magnitude of this low frequency noise reduction is established by the ratio of the expansion chamber cross-sectional area to the diffuser exit area (i.e., the area of the discharge opening 100), while the lowest frequency at which significant attenuation is achieved is determined by the volume of the chamber 30.

The low frequency noise reduction resulting from the previously described impedance mismatch is the first of three noise reduction mechanisms uniquely provided by the attenuator 10. The second noise reduction mechanism is the reactive and resonant sound attenuation provided by the reactive sound attenuating chamber 54 and the resonant attenuator structure 60 which, as will be seen, are connected in a novel parallel and overlapping relationship.

More specifically, as the cooled exhaust gas 70 is discharged into the expansion chamber 30, residual noise therein is simultaneously transmitted into the resonant sound attenuator 60 via portion $L_1$ of the perforated wall 58, and into the reactive sound attenuating chamber 54 through the portion $L_2$ of wall 58. Chamber 54 functions to reactively attenuate additional low frequency noise in the cooled gas 70, while the latticed wall structure 62, with its covering wall 64, functions to attenuate mid and high frequency noise therein. It should be noted that the reactive sound attenuating chamber 54 not only overlaps the resonant sound attenuator 60, but also extends beyond its inlet (i.e., the portion $L_2$ of the perforated wall 58) in opposite directions (i.e., to the left and right of the wall inlet section $L_2$ as viewed in FIG. 2). This two dimensional "offset" feature of the chamber 54 allows its reactive attenuating characteristics to conveniently be "tuned" by appropriately correlating the length $L_2$, and the dimensional interrelationships between the volume of chamber 54 and the length, width and height of the resonant attenuator 60.

A third and final sound attenuating mechanism is provided by the baffle 28, the perforated end wall 38 and the sound absorbing member 44, and the serpentine discharge flow path collectively defined thereby. Subsequent to its discharge into the expansion chamber 30, the cooled exhaust gas 70 is forced over the upper baffle end 36, downwardly between the baffle 28 and the sound absorbing member 44, around the lower end $48_c$ of the sound absorbing member, upwardly between the sound absorbing member 44 and the perforated end wall 38, and outwardly through the housing outlet 46. During traversal of this serpentine flow path, residual mid and high frequency noise in the cooled exhaust gas 70 is absorptively removed. Additionally, the sound absorbing member 44 provides line-of-sight general sound attenuation between the upper baffle end 36 and the housing outlet 46.

In the previously described manner, the sound attenuator 10 very effectively attenuates both core and turbine noise from the turbine engine exhaust gas 12. Via its unique threefold sound suppression technique, the attenuator accomplishes this desirable result by utilizing a very compact structure which may be easily sized and configured to be precisely matched (from an overall sound attenuation standpoint) to a variety of turbine engines. Moreover, simultaneous with its sound attenuation, the hot exhaust gas 12 is eduction cooled within the attenuator's housing (which is also cooled by the educted air flow). Finally, it is important to note that despite its compactness, the attenuator 10 imposes only a relatively low pressure drop upon the exhaust gas traversing it, and may be inexpensively constructed essentially entirely from sheet metal and conventional bulk sound absorbing material.

Figure 2A:
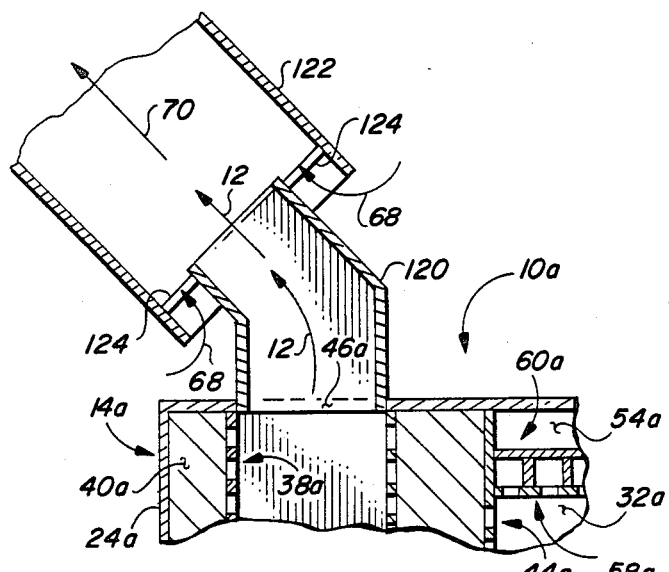
FIG. 2A is an enlarged scale fragmentary cross-sectional view taken through the noise suppressor along line 2—2 of FIG. 1, and illustrates a portion of an alternate embodiment of the noise suppressor in which eduction cooling apparatus is connected to its outlet.
Figure 3A:
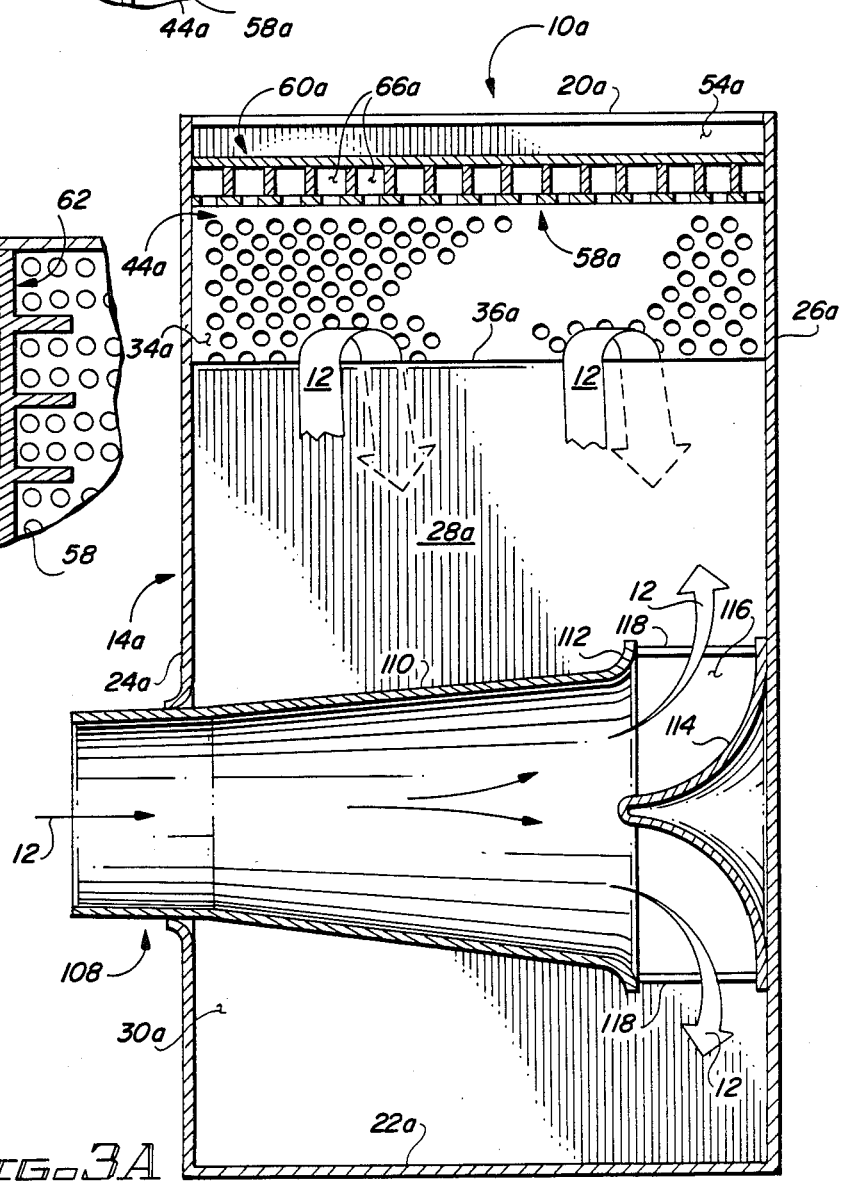
FIG. 3A is an enlarged scale cross-sectional view taken through the noise suppressor along line 3—3 of FIG. 1, and illustrates an alternate embodiment of the noise suppressor in which its inlet duct work is modified.

In FIGS. 2A and 3A an alternate embodiment $10_a$ of the attenuator 10 is illustrated, components similar to those in the previously described attenuator 10 being given the same reference numerals with the subscript "a". The attenuator $10_a$ is substantially identical to the attenuator 10, with the exception that the eduction cooling of the engine exhaust gas is performed externally of the attenuator at its downstream or outlet end. More specifically, the hot engine exhaust gas 12 is flowed into the expansion chamber $30_a$ via a non-educted inlet and diffusion duct 108 which has a circular cross-section and is extended into the expansion chamber $30_a$ through the housing wall $24_a$. Along a longitudinally central portion thereof, the duct 108 has a diffusion section 110 which is tapered radially outwardly in a downstream direction. At its downstream end 112 the diffusion section 110 has an annular, outwardly flared portion which cooperates with a generally bell-shaped end member 114 to define therewith an annular, radially outwardly facing outlet passage 116 positioned immediately adjacent the housing wall $26_a$. The end member 114 is intersecured to the diffusion duct end portion 112 by a circumferentially spaced series of support struts 118.

During operation of the attenuator $10_a$, the engine exhaust gas 12 is flowed into the duct 108, is diffused and slowed along the diffusion portion 110, and is forced into the expansion chamber $30_a$ via the radially facing annular outlet 116. From this point, the uncooled exhaust gas is forced through the attenuator $10_a$ in a manner identical to that previously described in conjunction with the attenuator 10. However, as the exhaust gas 12 exits the discharge opening $46_a$ (FIG. 2A), it enters a discharge duct 120 operatively secured to the attenuator housing $14_a$ at the outlet $46_a$. Circumscribing the outlet end of the discharge duct 120 is an eduction cooling duct 122. Duct 122 is substantially larger in cross-section than the discharge duct 120 and is secured thereto by a mutually spaced series of support struts 124. Discharge of the exhaust gas 12 into the eduction duct 122 draws a flow of ambient cooling air 68 into the lower end (as viewed in FIG. 2A) of the eduction duct. The cooling air flow 68 is mixed with the exhaust gas 12 in the duct 122 to form a stream 70 of cooled exhaust gas which is discharged via duct 122 to atmosphere. In this manner, a simplified ductwork structure is provided for the attenuator $10_a$ so that eduction cooling of the exhaust gas is effected subsequent to the sound attenuation thereof.

The foregoing detailed description is to be clearly understood as given by way of illustration and example only, the spirit and scope of this invention being limited solely by the appended claims.

We claim:

1. Compact gas turbine engine exhaust noise suppressor apparatus comprising:
   (a) a chamber having an inner surface, an inlet and an outlet;
   (b) baffle means within said chamber dividing said chamber into first and second subchambers communicating through a transfer passage, said second subchamber opening outwardly through said outlet;
   (c) sound absorbing means positioned within said second subchamber and defining with said baffle means a serpentine flow path extending from said transfer passage to said outlet;
   (d) duct means disposed within said first subchamber for receiving a flow of turbine engine exhaust gas through said inlet, diffusing the received gas, and discharging the diffused gas into said first subchamber;
   (e) reactive sound attenuating means disposed within said transfer passage within said chamber and communicating with said first subchamber and said second subchamber; and
   (f) resonant sound attenuating means disposed within said reactive sound attenuating means within said transfer passage within said chamber.

2. The apparatus of claim 1 wherein said reactive sound attenuating means include a wall, having a perforated section, inwardly displaced from the inner surface of said chamber and defining a reactive sound attenuating chamber, and said resonant sound attenuating means including a lattice structure disposed within at least a portion of said reactive sound attenuating chamber.

3. The apparatus of claim 1 wherein said sound absorbing means comprise a hollow sound attenuating member having a perforated outer wall and an interior space filled with a bulk sound absorbing material.

4. The apparatus of claim 1 wherein said apparatus further comprises means for utilizing air from a source thereof to cool the flow of exhaust gas.

5. The apparatus of claim 4 wherein said last-mentioned means include eduction duct means for inducing a flow of cooling air from a source thereof in response to the exhaust gas flow, and mixing the induced cooling air flow with the exhaust gas flow.

6. The apparatus of claim 5 wherein said eduction duct means is associated with said duct means.

7. The apparatus of claim 5 further comprising a gas exhaust duct connected to said outlet to discharge the flow of exhaust gas received by said apparatus, and wherein said eduction duct means are associated with said exhaust duct.

8. Compact gas turbine engine exhaust gas noise suppression and cooling apparatus comprising:
   (a) a housing including a first chamber having an inlet and an inner surface, a second chamber having an outlet and an inner surface and communicating with said first chamber through a transfer passage, and a third chamber, having an inner surface, disposed in the transfer passage and communicating with said first chamber and said second chamber through a perforated section of a dividing wall which extends from said first chamber to said second chamber;

(b) a resonant sound attenuating lattice positioned in said third chamber and communicating with said first chamber through a portion of said perforated section of said dividing wall;

(c) duct means for receiving exhaust gas from the engine and cooling air from a source thereof, mixing and diffusing the gas and air, and discharging the mixed and diffused gas and air, said duct means extending in a first direction into said first chamber and having a discharge opening positioned in said first chamber and facing in a second direction; and (d) reactive sound attenuating means disposed within said third chamber between said sound attenuating lattice and the inner surface of said third chamber.

9. The apparatus of claim 8 further comprising sound absorbing means positioned in said second chamber to define a baffle between said transfer passage and said outlet.

10. The apparatus of claim 9 wherein said sound absorbing means comprise a perforated wall defining a hollow sound absorbing member, the interior of said hollow sound absorbing member being filled with a bulk sound absorbing material.

11. The apparatus of claim 8 wherein said resonant sound attenuating lattice comprises a latticed wall structure having a first side extending along a first portion of said perforated section, and a covered second side.

12. The apparatus of claim 11 wherein said third chamber communicates with said first chamber through a second portion of said perforated section and extends past said second portion in opposite directions generally parallel to said dividing wall.

13. The apparatus of claim 8 wherein said first chamber includes first and second generally opposite, mutually spaced wall portions partially defining said first chamber; said duct means enter said first chamber through said inlet through said first wall portion; said discharge opening is positioned adjacent said second wall portion; and said second direction is generally perpendicular to said first direction.

14. Engine exhaust gas sound attenuating apparatus comprising:
a housing having an inlet to receive engine exhaust gas and an outlet to discharge sound attenuated exhaust gas;
baffle means disposed within said housing to divide said housing into a first chamber including the housing inlet, a second chamber including the housing outlet, and a transfer passage disposed within said housing between said first and second chambers;
the inlet of said first chamber including a duct extending into said first chamber to diffuse engine exhaust gases within said first chamber;
a reactive sound attenuating chamber disposed within said housing in said transfer passage and extending into said first chamber and into said second chamber, said reactive sound attenuating chamber including a perforated section associated with said first and said second chambers, said reactive sound attenuating chamber including a resonant sound attenuating lattice disposed therein; and
sound absorbing means disposed within said second chamber, said sound absorbing means having a baffle member including sound absorbing material, to form a serpentine flow path for exhaust gas within said second chamber.

15. The apparatus of claim 14 wherein said sound absorbing means comprises a perforated wall defining a cavity, said cavity being filled with a sound absorbing material.

16. The apparatus of claim 14 wherein said resonant sound attenuating comprises a latticed wall structure having a first side extending along a portion of said perforated section, and a covered second side.

17. The apparatus of claim 16 wherein said reactive sound attenuating chamber communicates with said first chamber through the balance of said perforated section, and wherein said reactive sound attenuating chamber extends beyond said balance of said perforated section in opposite directions generally parallel to said transfer passage.

18. The apparatus of claim 14 further comprising means for cooling the flow of exhaust gas.

19. The apparatus of claim 18 wherein said cooling means include eduction means, associated with said duct, for inducing a flow of cooling air from a source thereof and mixing the cooling air with the flow of exhaust gas.

20. The apparatus of claim 18 further comprising a gas exhaust duct connected to said outlet to discharge the flow of exhaust gas received by said apparatus, and eduction means, associated with said gas exhaust duct, for inducing a flow of cooling air from a source thereof and mixing the cooling air with the flow of exhaust gas discharged from said gas exhaust duct.

21. The apparatus of claim 14 wherein said duct extends inwardly in a first direction through said inlet of said housing; said duct having a gas discharge opening positioned in a second direction generally perpendicular to said first direction.

22. The apparatus of claim 21 wherein said gas discharge opening is of a generally annular configuration.

23. The apparatus of claim 14 further comprising a perforated wall inwardly spaced from said second end wall and defining therewith a cavity, said cavity being filled with a sound absorbing material.

24. Compact engine exhaust gas noise suppression apparatus comprising:
(a) a housing having an inlet and an outlet, and a chamber therein including first and second mutually spaced, generally opposite walls, said first wall having said inlet, said inlet and said outlet both communicating with said chamber;
(b) a reactive sound attenuating subchamber disposed within and communicating with said chamber;
(c) a resonant sound attenuating lattice positioned within said reactive sound attenuating subchamber and communicating with said chamber; and
(d) duct means for receiving, diffusing and discharging a flow of engine exhaust gas, said duct means extending inwardly through said inlet in said first wall in a first direction and having a gas discharge opening positioned inwardly adjacent said second wall and facing in a second direction.

25. The apparatus of claim 24 further comprising a sound absorbing member disposed in said chamber, and wherein said chamber communicates with said outlet via a serpentine flow path defined in part around said sound absorbing member.

26. Engine exhaust gas sound attenuating apparatus comprising:

(a) a housing having an inner surface, an inlet to receive engine exhaust gas and an outlet to discharge sound attenuated exhaust gas;

(b) baffle means disposed within said housing and dividing the interior of said housing into first and second chambers communicating through a transfer passage, said second chamber having said outlet and said first chamber having said inlet;

(c) sound absorbing means positioned in said second chamber, and creating therein a serpentine flow path extending from said transfer passage to said outlet;

(d) a wall positioned inwardly from the inner surface of said housing, having a perforated section and extending from said sound absorbing member through to said first chamber, said wall defining within said housing a reactive sound attenuating chamber;

(e) resonant sound attenuating means including a lattice structure positioned within said reactive sound attenuating chamber and extending along a portion of said wall; and (f) a duct adapted to receive, diffuse and discharge a flow of exhaust gas, said duct extending in a first direction into said inlet of said first chamber and having a gas discharge opening positioned within said first chamber and facing in a second direction.

27. The apparatus of claim 26 wherein said sound absorbing means comprises a perforated wall defining a cavity, said cavity being filled with a sound absorbing material.

28. The apparatus of claim 26 wherein said wall includes a perforated section providing communication between said first chamber and said reactive sound attenuating chamber and said lattice structure has a first side extending along a portion of said perforated section, and a covered second side.

29. The apparatus of claim 28 wherein said reactive sound attenuating chamber communicates with said first chamber through the balance of said perforated section, and wherein said reactive sound attenuation chamber extends beyond said balance of said perforated section.

30. The apparatus of claim 26 further comprising means for cooling the flow of exhaust gas.

31. The apparatus of claim 30 wherein said cooling means include eduction means, associated with said duct (f), for inducing a flow of cooling air from a source thereof and mixing the cooling air with the flow of exhaust gas.

32. The apparatus of claim 30 further comprising an exhaust gas duct connected to said outlet to discharge the flow of exhaust gas received by said apparatus, and eduction means, associated with said gas exhaust duct, for inducing a flow of cooling air from a source thereof and mixing the cooling air with the flow of exhaust gas discharged from said gas exhaust duct.

33. The apparatus of claim 26 wherein said second direction is generally perpendicular to said first direction.

34. The apparatus of claim 33 wherein said gas discharge opening is of a generally annular configuration.

35. The apparatus of claim 26, further comprising a perforated wall disposed in said second chamber and defining therewith a cavity, said cavity being filled with a sound absorbing material.

36. Engine exhaust gas sound attenuating apparatus comprising:

(a) a housing having an inner surface, an inlet to receive engine exhaust gas and an outlet to discharge sound attenuated exhaust gas;

(b) baffle means disposed within said housing and dividing the interior of said housing into first and second chambers communicating through a transfer passage, said second chamber having said outlet and said first chamber having said inlet;

(c) sound absorbing means positioned in said second chamber;

(d) a wall positioned inwardly of said housing and extending from said sound absorbing member through to said first chamber, said wall defining within said housing a reactive sound attenuating chamber and having a perforated section providing communication between said first chamber and said reactive sound attenuating chamber;

(e) resonant sound attenuating means including a lattice structure positioned within said reactive sound attenuating chamber and extending along a portion of said perforated section of said wall; and (f) a duct adapted to receive, diffuse and discharge a flow of exhaust gas, said duct extending in a first direction into said inlet of said first chamber and having a gas discharge opening positioned within said first chamber and facing in a second direction.

37. Engine exhaust gas sound attenuating apparatus comprising:

(a) a housing having an inner surface, an inlet to receive engine exhaust gas and an outlet to discharge sound attenuated exhaust gas;

(b) baffle means disposed within said housing and dividing the interior of said housing into first and second chambers communicating through a transfer passage, said second chamber having outlet and said first chamber having said inlet;

(c) sound absorbing means positioned in said second chamber and creating therein a serpentine flow path extending from said transfer passage to said outlet;

(d) a wall positioned inwardly from the inner surface of said housing and extending from said sound absorbing member through to said first chamber, said wall defining within said housing a reactive sound attenuating chamber and having a perforated section providing communication between said first chamber and said reactive sound attenuating chamber;

(e) resonant sound attenuating means including a lattice structure positioned within said reactive sound attenuating chamber and extending along a portion of said perforated section of said wall; and (f) a duct adapted to receive, diffuse and discharge a flow of exhaust gas, said duct extending in a first direction into said inlet of said first chamber and having a gas discharge opening positioned within said first chamber and facing in a second direction.

38. Engine exhaust gas sound attenuating apparatus comprising:

(a) a housing having an inner surface, an inlet to receive engine exhaust gas and an outlet to discharge sound attenuated exhaust gas;

(b) baffle means disposed within said housing and dividing the interior of said housing into first and second chambers communicating through a transfer passage, said second chamber having said outlet and said first chamber having said inlet;

(c) sound absorbing means positioned in said second chamber and creating therein a serpentine flow path extending from said transfer passage to said outlet;

(d) a wall positioned inwardly from the inner surface of said housing and extending from said sound absorbing member through to said first chamber, said wall defining within said housing a reactive sound attenuating chamber and having a perforated section providing communication between said first chamber and said reactive sound attenuating chamber;

(e) resonant sound attenuating means including a lattice structure positioned within said reactive sound attenuating chamber and extending along a portion of said perforated section of said wall; and (f) a duct operably associated with said first chamber to receive, diffuse and discharge a flow of exhaust gas.

* * * * *